United States Patent [19]
Hoffman et al.

[11] Patent Number: 4,806,712
[45] Date of Patent: Feb. 21, 1989

[54] ELECTRICAL SWITCH FOR DOOR LATCH

[75] Inventors: Marcos Hoffman, Warren; Jeffrey K. Joyner, Ann Arbor; Jiri Paulik, Sterling Heights, all of Mich.

[73] Assignee: General Motors Corporation, Detroit, Mich.

[21] Appl. No.: 162,990

[22] Filed: Mar. 2, 1988

[51] Int. Cl.⁴ ....................... H01H 3/16; H01H 27/06; B60R 25/00; E05B 65/12

[52] U.S. Cl. .............................. 200/61.62; 200/61.64; 200/501; 200/302.1

[58] Field of Search ............. 200/11 R, 11 DA, 11 G, 200/11 J, 11 Y, 11 TW, 61.62, 61.64–61.68, 153 P, 302.1, 303, 318, 321; 70/249, 250, 239, 243, 248, 251, 252, 254, 255, 257; 292/216, DIG. 43

[56] References Cited

U.S. PATENT DOCUMENTS

| | | | |
|---|---|---|---|
| 2,469,082 | 5/1949 | Scanlon | 200/61.64 |
| 3,255,319 | 6/1966 | Paine | 200/302.1 X |
| 3,725,939 | 4/1973 | Saltzstein | 343/225 |
| 3,985,009 | 10/1976 | Lipschutz | 70/249 |
| 4,652,947 | 3/1987 | Oka et al. | 200/303 X |

*Primary Examiner*—J. R. Scott
*Attorney, Agent, or Firm*—Charles E. Leahy

[57] ABSTRACT

The vehicle door latch includes a housing having latch bolt rotatably mounted for engagement with a striker mounted on the door jamb. The door latch includes a detent mechanism adapted to establish the latch bolt in rotary positions to selectively latch the door in a primary closed position, to latch the door at a secondary door ajar position, and to unlatch the door at an unlatched position allowing door opening movement. The electrical switch includes a rotor rotatably mounted on the latch housing and carrying a first set of electrical contacts adapted upon rotary movement of the rotor to electrically connect with a second set of electrical contacts mounted on the latch housing. The rotor and the latch bolt each have gear teeth provided respectively thereon and meshing with one another whereby rotary movement of the latch bolt induces corresponding rotary movement of the rotor and thereby enables the switch mechanism to provide electrical signals corresponding to the various positions of the latch bolt.

4 Claims, 1 Drawing Sheet

ELECTRICAL SWITCH FOR DOOR LATCH

The invention relates to an electrical switch for sensing the position of a vehicle door and more particularly provides a switch mounted on the door latch.

BACKGROUND OF THE INVENTION

It is well known in motor vehicles to use an electrical switch to sense the position of the door. The electrical switch completes or breaks an electrical circuit commonly used to operate electrical devices, such as a door ajar buzzer, a dome lamp, a seat belt retractor, or other electrical devices.

It is known in the prior art that the door position sensing switch can be mounted on the door jamb so that the door opens and closes the switch as the door is opened and closed.

It is also known that the door position sensing switch may be associated with the door latch operating linkages and opened and closed by a cam or a rod whose position corresponds with the condition of the door latch.

The present invention provides a new and improved door sensing switch arrangement in which the switch is mounted in the door latch housing and includes a rotor operatively connected to the door latch bolt by gear teeth provided respectively thereon.

SUMMARY OF THE INVENTION

The vehicle door latch includes a housing having a latch bolt rotatably mounted for engagement with a striker mounted on the door jamb. The door latch includes a detent mechanism adapted to establish the latch bolt in rotary positions to selectively latch the door in a primary closed position, to latch the door at a secondary door ajar position, and to unlatch the door at an unlatched position allowing door opening movement. The electrical switch includes a rotor rotatably mounted on the latch housing and carrying a first set of electrical contacts adapted upon rotary movement of the rotor to electrically connect with a second set of electrical contacts mounted on the latch housing. The rotor and the latch bolt each have gear teeth provided respectively thereon and meshing with one another whereby rotary movement of the latch bolt induces corresponding rotary movement of the rotor and thereby enables the switch mechanism to provide electrical signals corresponding to the various positions of the latch bolt.

DESCRIPTION OF THE PREFERRED EMBODIMENT

Figure 1:
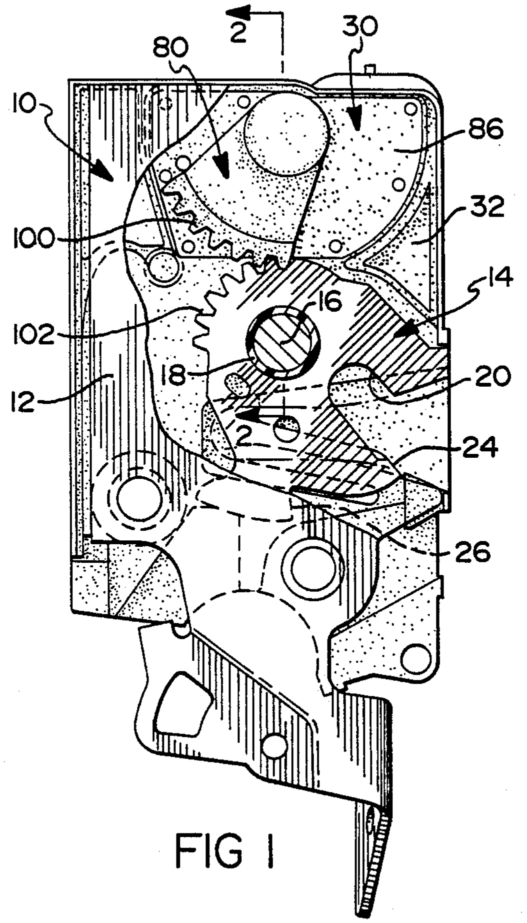
FIG. 1 is an elevation view through the door latch assembly having parts broken away and in section to show the mechanism for operating the electrical switch.

Referring to FIG. 1, a door latch assembly generally indicated at 10 includes a stamped steel housing 12 having a latch bolt 14 rotatably mounted thereon by a pivot shaft 16 and bushing 18. As best seen in FIG. 1, the latch bolt 14 includes a latch recess 20 which communicates outwardly toward the door opening when the latch bolt 14 is established at its unlatched position of FIG. 1. When the door is slammed to the closed position, the latch assembly 10 moves into engagement with a striker, not shown, mounted on the door jamb and the striker enters the latch bar recess 20 and causes the latch bolt 14 to be rotated clockwise as viewed in FIG. 1.

The latch bolt 14 includes a primary latch face 24 and a secondary latch face 26. A detent lever, not shown, is pivotally mounted on the housing 12 and engages with the secondary latch face 26 to latch the latch bolt 14 at the secondary door ajar position and on further closing movement of the door to the fully closed position engages with the primary latch face 24. Engagement of the detent lever with these latch faces is effective to latch the latch bolt 14 at its rotary position capturing the striker and thereby retains the door in either fully closed position or the door ajar position. The detent lever is operated by a handle mechanism, not shown, for unlatching the latch bolt 14 when an inside or outside door handle is actuated by the vehicle user.

A switch mechanism generally indicated at 30 is mounted on the door latch 10 and indicates the position of the latch bolt 14. The switch is housed within a plastic housing 32 which is mounted on the door latch housing 12. The plastic housing 32 includes a well 34 in which electrical contact strips 36, 38, 40 and 42 are embedded. These contacts are electrically connected to various electrical circuits of the motor vehicle, such as the dome lamp, door ajar signal, seat belt retractor or the like by conductor portions 44, 46, 48 and 50 integral therewith.

Figure 3:
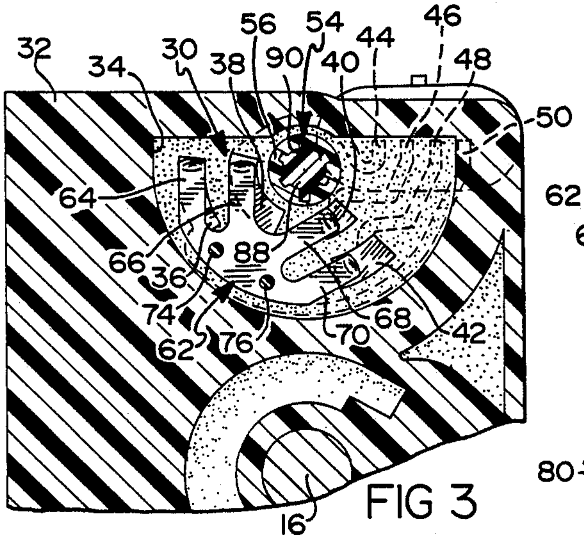
FIG. 3 is a sectional view taken in the direction of arrows 3—3 of FIG. 2.

The switch also includes a rotor 54, also of molded plastic, and having a cylindrical pivot portion 56 which seats in a cylindrical recess 58 of the plastic housing 32 so that the rotor 54 is rotatably mounted. The rotor 54 carries an electrical contact member 62 having spring finger contacts 64, 66, 68 and 70. As best seen in FIG. 3, the spring finger contacts 64, 66, 68 and 70 of the electrical contact 62, respectively contact with the contact strips 36, 38, 40 and 42. The electrical contact 62 is mounted on the rotor 54 by a pair of plastic mounting studs 74 and 76 of the rotor 54 which extend through aligned apertures in the electrical contact 62.

Figure 4:
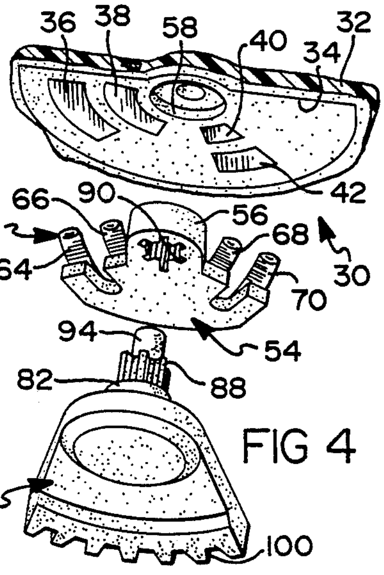
FIG. 4 is an exploded perspective view showing the gear sector, the switch rotor, and the switch housing.

As best seen in FIGS. 3 and 4, a sector member 80, also of molded plastic, is also mounted in the plastic housing 32 and has a cylindrical boss 82 which rotatably seats within a cylindrical bore 84 of a plastic cover member 86 which overlies the rotor 54 mounted in the well 34 of the plastic housing 32. The cylindrical boss 82 is necked down and has spur gear teeth 88 molded integrally therewith which mesh with mating teeth 90 provided in an opening in the cylindrical pivot portion 56 of the rotor 54. The endmost cylindrical portion 94 of the cylindrical boss 82 seats in a cylindrical opening 96 in the plastic housing 32. Accordingly, it is appreciated that the sector member 80 is rotatably mounted within the plastic housing 32 and is non-rotatably associated with the rotor 54 by the gear teeth 88 and 90 meshing therebetween so that the rotor 54 will rotate in unison with the sector member 80. In the alternative the rotor 54 and sector member 80 may be molded integrally as a single part.

As best seen in FIG. 1, the sector member 80 has a plurality of gear teeth 100 displayed in an arc about the axis of rotation of the sector member 80. The latch bolt 14 has a plurality of gear teeth 102 formed integrally thereon and displayed in an arc about the pivot shaft 16. The gear teeth 100 of the sector member 80 mesh with the gear teeth 102 of the latch bolt 14. Accordingly, it will be understood that rotation of the latch bolt 14 will effect simultaneous coordinated rotation of the sector member 80 and the rotor 54 to actuate the electical switch.

In comparing FIGS. 1 and 3, it is seen that the unlatched position of the latch bolt 14 as shown in FIG. 1 establishes the switch in the position of FIG. 3 in which all four of the electrical contacts are established. When the latch bolt 14 has rotated clockwise to an extent causing the detent lever to engage with the secondary latch face 26, the spring finger contacts 68 and 70 of the rotor will have been rotated in a counterclockwise direction to disengage from their respective contact strips 40 and 42 of the plastic housing 32. When the latch bolt 14 has rotated further clockwise to the door closed position, the detect lever engages the primary latch face 24 and the rotor 54 will have been rotated further counterclockwise as viewed in FIG. 3 so that the contact strip 64 of the rotor 54 will have become disengaged from the contact strip 36 of the plastic housing 32 and contact 66 remains in contact with contact strip 38.

When the door is opened, the latch bolt 14 returns counterclockwise to the FIG. 1 position and the rotor is returned clockwise to the FIG. 3 position.

Figure 2:
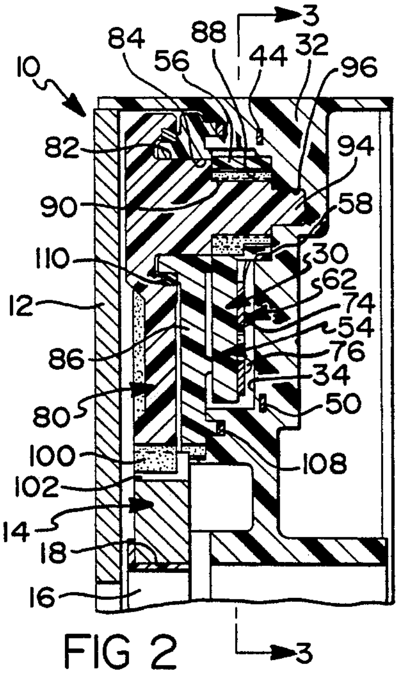
FIG. 2 is a sectional view taken in the direction of arrows 2—2 of FIG. 1 and showing the electrical switch and the operating mechanism therefor.

Referring again to FIG. 2, it is seen that the switch is designed to maintain the electrical contacts in a hermetically sealed environment. In particular, it is seen that the switch housing cover 86 is sealed to the plastic housing 32 by an annular gasket 108 which is seated between the switch cover 86 and the plastic housing 39. Furthermore, an annular gasket 110 is situated between the switch cover 86 and the sector member 80. Accordingly, water or dirt cannot enter the well 34 in which the electrical switch is housed.

Thus it is seen that the invention provides a new and improved door latch switch assembly in which the electrical switch is mounted within the door latch housing and operated by a rotor having gear teeth meshing with integral gear teeth provided on the rotatably mounted latch bolt.

It will be appreciated that the gear drive mechanism acting directly between the switch rotor and the latch bolt provides positive and reliable direct operation of the switch in both directions of door movement.

The embodiments of the invention in which an exclusive property or privilege is claimed are defined as follows:

1. In combination with a vehicle door latch having a latch bolt rotatably mounted upon a latch housing for rotary movement to selectively latch and unlatch a door, an electrical switch mechanism associated with the door latch comprising: rotor means, a housing, first electrical contact means carried by the rotor means, second electrical contact means mounted on the housing, means movably mounting the rotor means on the housing so that movement of the rotor means moves the the first electrical contact means relative to the second electrical contact means, and said rotor means and said latch bolt having gear teeth provided respectively thereon and meshing with one another whereby rotary movement of the latch bolt induces movement of the rotor means to operate the switch.

2. In combination with a vehicle door latch having a latch bolt rotatably mounted upon a latch housing for rotary movement to selectively latch and unlatch a door, an electrical switch mechanism associated with the door latch comprising: a rotor, a housing, first electrical contact means carried by the rotor, second electrical contact means mounted on the housing, means rotatably mounting the rotor on the housing so that rotary movement of the rotor moves the the first electrical contact means relative to the second electrical contact means, a plurality of gear teeth provided on the latch bolt, a gear sector having gear teeth provided thereon, means rotatably mounting the gear sector on the housing with the gear teeth of the gear sector meshing with the gear teeth of the latch bolt so that rotation of the latch bolt rotates the gear sector, and means operatively connecting the gear sector with the rotor so that rotary movement of the gear sector rotates the rotor.

3. In combination with a vehicle door latch having a latch bolt rotatably mounted upon a latch housing for rotary movement to selectively latch and unlatch a door, an electrical switch mechanism associated with the door latch comprising:

a plurality of gear teeth provided on the latch bolt;
a switch housing of molded plastic mounted on the latch housing and having a switch cavity therein;
a first plurality of switch contacts mounted on the switch housing in the switch cavity thereof;
a rotor means;
a second plurality of switch contacts mounted on rotor means;
and means rotatably mounting the rotor means on the switch housing with the rotor means gear teeth meshing with the latch bolt gear teeth so that rotary movement of the rotor means electrically connects and disconnects the first plurality of switch contacts with the second plurality of switch contacts.

4. In combination with a vehicle door latch having a latch bolt rotatably mounted upon a latch housing for rotary movement to selectively latch and unlatch a door, an electrical switch mechanism associated with the door latch comprising:

a switch housing of molded plastic mounted on the latch housing and having a switch cavity therein;
a first plurality of switch contacts mounted on the switch housing in the switch cavity thereof;
a switch rotor;
a second plurality of switch contacts mounted on switch rotor;
means rotatably mounting the switch rotor on the switch housing so that rotary movement of the rotor electrically connects and disconnects the first plurality of switch contacts with the second plurality of switch contacts;
a plurality of gear teeth provided on the latch bolt;
a gear sector having gear teeth thereon;
means rotatably mounting the gear sector on the switch housing with the gear teeth of the gear sector meshing with the gear teeth of the latch bolt whereby rotary movement of the latch bolt rotates the gear sector;
drive means connecting the rotor and the gear sector whereby rotary movement of the latch bolt induces corresponding rotary movement of the rotor and thereby enables the switch mechanism to provide electrical signals corresponding to the positions of the latch bolt; and
a molded plastic cover mounted upon the plastic housing to seal the switch cavity against the entry of foreign matter therein.

* * * * *